United States Patent
Heimlicher et al.

(10) Patent No.: US 7,408,122 B2
(45) Date of Patent: Aug. 5, 2008

(54) CABLE GLAND

(75) Inventors: Peter Heimlicher, Fribourg (CH);
Fabrice Charriere, Broc (CH)

(73) Assignee: Optosys SA (CH)

( * ) Notice: Subject to any disclaimer, the term of this patent is extended or adjusted under 35 U.S.C. 154(b) by 0 days.

(21) Appl. No.: 11/469,703

(22) Filed: Sep. 1, 2006

(65) Prior Publication Data
US 2007/0227772 A1 Oct. 4, 2007

(30) Foreign Application Priority Data
Sep. 1, 2005 (EP) .................................. 05405514

(51) Int. Cl.
*H02G 3/06* (2006.01)
(52) U.S. Cl. .................. 174/653; 174/665; 174/660; 174/135; 439/583; 248/56; 16/2.1
(58) Field of Classification Search ......... 174/653–655, 174/665, 660–662, 135 G, 59, 151, 152 G; 439/584, 583, 462, 581; 248/56; 16/2.1, 16/2.2
See application file for complete search history.

(56) References Cited

U.S. PATENT DOCUMENTS

| 4,549,037 | A | * | 10/1985 | Bawa et al. | 174/667 |
| 4,549,755 | A | * | 10/1985 | Kot et al. | 285/341 |
| 4,912,287 | A | * | 3/1990 | Ono et al. | 174/153 G |
| 5,532,436 | A | * | 7/1996 | Moyers et al. | 174/151 |
| RE38,294 | E | * | 11/2003 | Nattel et al. | 174/59 |
| 6,812,406 | B2 | * | 11/2004 | Hand | 174/667 |

FOREIGN PATENT DOCUMENTS

| DE | 1 640 968 | 1/1971 |
| GB | 1 526 766 | 9/1987 |

OTHER PUBLICATIONS

European Search Report, 3 pages.

* cited by examiner

*Primary Examiner*—Dhiru R Patel
(74) *Attorney, Agent, or Firm*—Ostrolenk, Faber, Gerb & Soffen, LLP

(57) ABSTRACT

The invention relates to a cable gland. The latter comprises a gland body for feeding a cable therethrough, an elastic sealing ring that is applicable to the front side of the gland body and whose internal diameter essentially corresponds to the diameter of the cable, and a gland ring that is applicable to the sealing ring on the opposite side of the gland body and is maintained by connecting means in an assembled condition at such an axial distance from the gland body that the sealing ring is clamped between the gland ring and the gland body so that its radially inner surface is pressed against the cable. These connecting means form a snap-on connection that is closable for the assembly of the cable gland by axially pushing together the gland ring and the gland body and that connects the gland ring and the gland body undetachably in their closed condition. A preferred field of application are encapsulated sensors having an enclosure into which a connecting cable is guided through a gland body of a cable gland that passes through the enclosure wall.

13 Claims, 2 Drawing Sheets

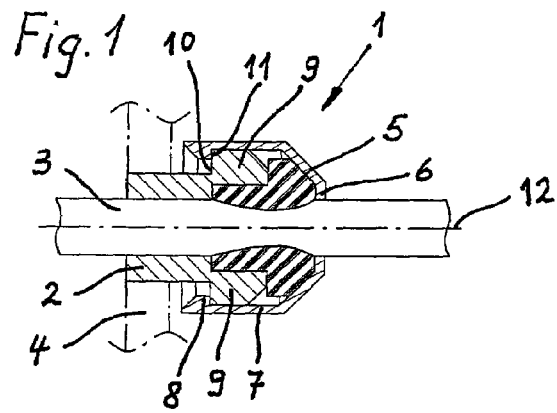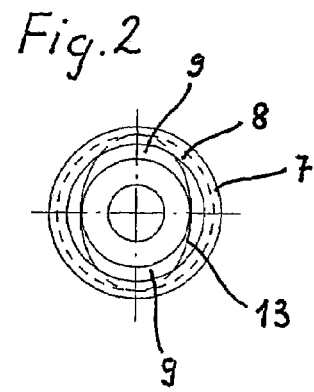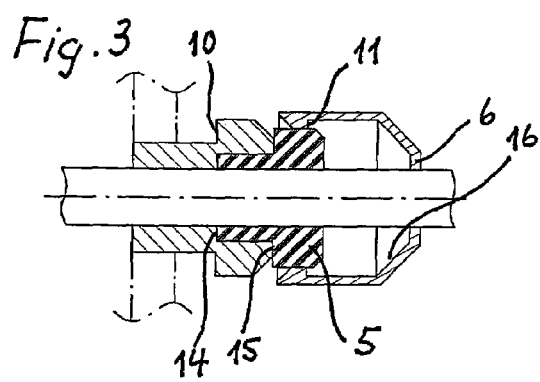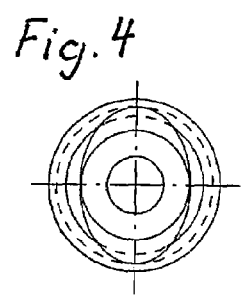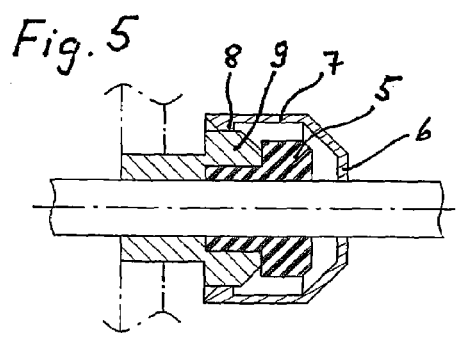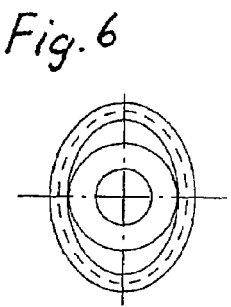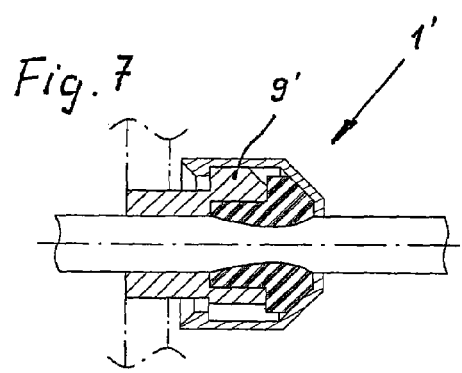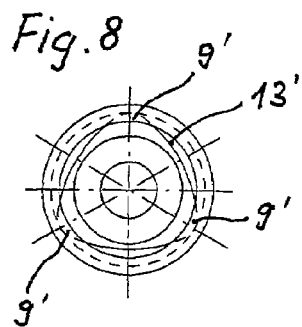

CABLE GLAND

CROSS REFERENCE TO RELATED APPLICATIONS

This application claims the benefit of the filing date of European Patent Application No. 05405514.0 filed 1 Sep. 2005, the disclosure of which is hereby incorporated by reference.

BACKGROUND OF THE INVENTION

1. Field of the Invention

The invention relates to a cable gland, and to an encapsulated sensor provided with the cable gland.

2. Description to the Related Art

For a tight feedthrough of a cable trough a wall, it is known in the art to guide the cable through a gland body and to clamp a sealing ring between the gland body and a coaxially arranged gland ring such that its radially inner surface is pressed against the cable. In the cable gland disclosed in Swiss Patent Specification CH480747, the gland ring is formed by the bottom portion of a coupling nut that is screwed onto the gland body, and the sealing ring is compressed by tightening the coupling nut.

In cable glands of this kind, a tight seal is only ensured when the coupling nut is sufficiently tightened. In a mounted cable gland, it is not visible whether this is the case or not, such that assembly faults are difficult to detect. Furthermore, it cannot be excluded that a coupling nut may be loosened by improper manipulations, thereby affecting the tightness of the cable gland.

SUMMARY OF THE INVENTION

It is an object of the invention to avoid this disadvantage and to provide a cable gland that is simple to assemble and permanently ensures a reliable sealing action.

This object is attained by a cable gland comprising a gland body for feeding a cable therethrough, an elastic sealing ring that is applicable to the front side of the gland body and whose internal diameter essentially corresponds to the diameter of the cable, and a gland ring that is applicable to the sealing ring on the opposite side of the gland body and is maintained by connecting means in an assembled condition at such an axial distance from the gland body that the sealing ring is clamped between the gland ring and the gland body so that its radially inner surface is pressed against the cable, wherein the connecting means form a snap-on connection that is closable for the assembly of the cable gland by axially pushing together the gland ring and the gland body and that connects the gland ring and the glad body undetachably in their closed condition. Preferred embodiments are defined in the dependent claims.

The invention will be explained in more detail hereinafter by means of exemplary embodiments and with reference to the figures.

BRIEF DESCRIPTION OF THE DRAWINGS

FIG. 1 schematically shows the longitudinal section of a cable gland in its assembled condition;

FIG. 2 shows the axial view of the cable gland according to FIG. 1;

FIGS. 3 and 4 show illustrations corresponding to FIGS. 1 and 2 of the same cable gland in the condition prior to its assembly;

FIGS. 5 and 6 show illustrations corresponding to FIGS. 1 and 2 of the same cable gland during its assembly;

FIGS. 7 and 8 show an alternative embodiment of the cable gland in views corresponding to FIGS. 1 and 2.

DESCRIPTION OF A PREFERRED EMBODIMENT

Figure 9:
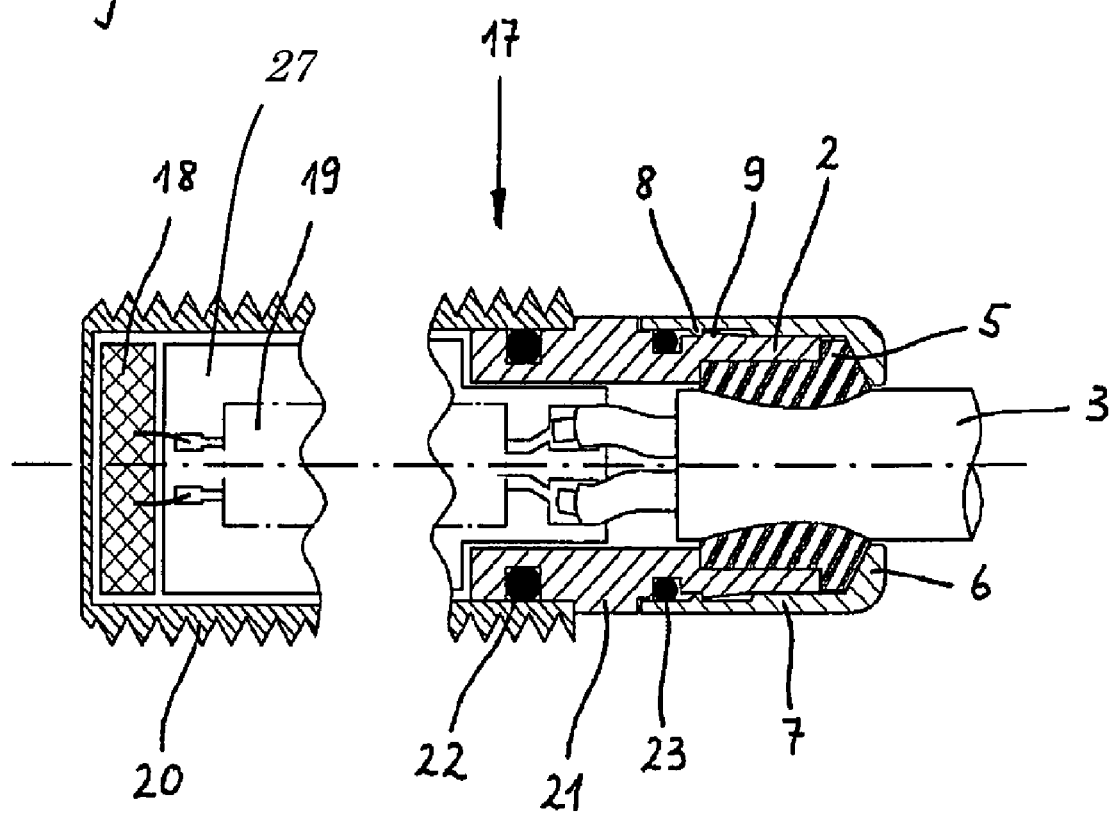
FIG. 9 shows an encapsulated inductive proximity sensor with an enclosure and a connecting cable that is guided into the latter through a cable gland.

FIGS. 1 and 2 schematically show a cable gland 1 in its mounted condition. It includes a gland body 2 through the bore of which a cable 3 having a circular cross-section is guided. Gland body 2 is inserted in a wall 4 that is symbolically indicated by chain dotted lines such that the bore of gland body 2 and thus also cable 3 pass through wall 4. Alternatively, gland body 2 might be integrally connected to wall 4.

To ensure a tight seal of cable 3 in gland body 2, cable gland 1 furthermore includes an elastic sealing ring 5 whose internal diameter essentially corresponds to the diameter of cable 3 and whose front side abuts to gland body 2 in this assembled condition, as well as a gland ring 6 that abuts to the sealing ring opposite to the gland body and is maintained by connecting means at such an axial distance from the gland body that the sealing ring is clamped between the gland ring and the gland body. The radially inner surface of the sealing ring is thereby pressed against the cable.

The connecting means include a circular jacket 7 that extends from the outer edge of gland ring 6 toward gland body 2 and whose inner side is provided with a circular projection 8, as well as corresponding cams 9 provided on the outside of gland body 2 and behind which the mentioned projection 8 engages in the assembled condition. Gland ring 6 and the adjacent jacket 7 together form a cage in which sealing ring 5 is retained.

In FIGS. 3 and 4, the cable gland is illustrated in the condition prior to its assembly, and FIGS. 5 and 6 show the same cable gland during its assembly. The latter is performed by pressing gland body 2 and gland ring 6 together in the axial direction, projection 8 sliding over cams 9 of the gland body while jacket 7 is elastically deformed (see FIGS. 5 and 6). As soon as projection 8 has overpassed cams 9, the jacket resumes its original shape so that the projection snaps in behind the cams.

Locking surfaces 10, 11 of cams 9 and of circular projection 8, which are adjoining in this assembled condition, preferably lie in a plane that is perpendicular to axis 12 or are even slightly undercut with respect to that plane such that the jacket can no longer be pulled off from the gland body even with a substantial effort. No means are provided for subsequently detaching the connection without damaging jacket 7, and the connection is therefore undetachable in the sense of the term as it is understood here.

Compared to a screw connection, this snap-on connection between gland ring 6 and gland body 2 offers the advantage that the precompression of sealing ring 5 is predetermined by the positions of the corresponding connecting elements such that e.g. a tightness defect due to insufficient tightening of a screw connection is excluded. The snap-on connection is undetachable so that any manipulation of the assembled cable gland 1 is excluded. Both jacket 7 and gland ring 6 may be produced with smooth outer surfaces as structures allowing the application of a rotation tool such as parallel surfaces for the application of an open-end wrench, in particular, are not necessary. This offers the additional advantage that jacket 7 may have particularly thin walls. Ultimately, the components of the snap-on connection are simple to manufacture, and they allow a quick and safe assembly of cable gland 1.

Seen in the gland body cross-section, cams 9 are rounded to ensure that the deformation of jacket 7 that occurs during the assembly is as gentle as possible and particularly that its elastic limit is not exceeded. Circumferential line 13 that runs over the apexes of the cams and in the axial view shown in FIG. 2 corresponds to the contour of the gland body preferably has the form of a regular convex polygon with rounded edges. The same applies to a gland body 2 having only two cams 9: In the sense of the term as it is understood here, a polygon having two edges corresponds to the contour of the intersection of two circles of the same size.

The rounded portions of adjacent cams 9 preferably adjoin tangentially so that all parts of circumferential line 13 are round. In the example according to FIGS. 1 and 2, the gland body comprises two cams arranged in opposite positions that are rounded in such a manner that the mentioned circumferential line 13 has the form of an ellipse.

The length of the circumferential line running over the cam apexes is preferably not greater than the inner circumference of circular projection 8 on the inside of the jacket so that jacket 7 is not elongated during the assembly.

Jacket 7 is made of a material that allows a sufficient elastic deformation for the assembly. Suitable materials are e.g. steel, aluminum, or technical plastics. Any combination of these same materials may also be used for gland body 2 and gland ring 6. Gland ring 6 and jacket 7 are preferably produced in one piece from the same material.

Sealing ring 5 comprises a first portion that is pushed into the gland body and abuts to an inner front surface 14 of the latter, followed by a second portion that abuts to an outer front surface 15 of the gland body. This second portion of the sealing ring is located outside the gland body and is pressed radially inwards, i.e. against cable 6 in the assembled condition by a conical clamping surface 16 of gland ring 6.

FIGS. 7 and 8 schematically show a mounted cable gland 1' that differs from the variant illustrated in FIGS. 1 and 2 in that three cams 9' that are regularly distributed around the circumference of the gland body are provided instead of two. Circumferential line 13' of the gland body that is running over the cam apexes and appears in FIG. 8 has the form of a regular triangle with rounded edges. The edges are rounded in such a manner that circumferential line 13' has the form of a Releaux triangle with rounded edges.

FIG. 9 shows an encapsulated sensor 27 having a tubular enclosure 17 one end portion of which forms the gland body 2 of a cable gland of the kind described with reference to FIGS. 1 to 6 and through which a connecting cable 3 is guided into the enclosure. The sensor 27 is an inductive proximity sensor having a measuring coil 18 arranged at one end of the enclosure and connected to connecting cable 3 via a measuring circuit 19.

Enclosure 17 is composed of a first sleeve 20 which is closed on one side and in which measuring coil 18 is arranged, and which is provided with an external thread for mounting the sensor, and of a corresponding second sleeve 21 one end portion of which is inserted in the open end of first sleeve 20 and sealed against the latter by means of an O-ring 23 and whose second end portion forms gland body 2 of the cable gland. The maximum external diameter of the cable gland, in this case the jacket diameter, is smaller than the external diameter of first sleeve 20 and preferably also smaller than the core diameter of its thread such that the sensor is insertable, with the cable first, in a mounting bore intended for the attachment of first sleeve 20.

Gland ring 6 and following cylindrical jacket 7 with internal circular projection 8 are made in one piece, preferably from steel, aluminum, or a technical plastic material. Projection 8 engages behind two corresponding cams 9 provided in opposite positions on the outside of gland body 2. These cams 9 are shaped such that circumferential line 13 running over the cam apexes has the shape of an ellipse, as appears in FIG. 2.

Also in accordance with FIGS. 1 and 2, sealing ring 5 comprises a first portion that is inserted into the gland body up to an inner front surface of the same and a second portion that abuts to an outer front surface of the gland body. The gap between the outer surface of the gland body and the inner surface of the jacket is sealed behind cams 9 and corresponding projection 8 of the jacket by an O-ring 23. At the same time, the latter stabilizes the position of jacket 7 with respect to gland body 2 in the radial direction, which is useful particularly if only two cams 9 are provided for their axial connection. The end portion of second sleeve 21 that forms gland body 2 is thinner than a middle portion thereof whose diameter is equal to the external diameter of jacket 7.

As a modification of the previously described specific exemplary embodiments, instead of the cylindrical inner surface, the gland body might have an inner surface opening conically toward the gland ring and abutted by a portion of the sealing ring that is inserted into the gland body. In this case, the internal front surface 14 of the gland body that is shown in the figures might be omitted.

The invention claimed is:

1. Cable gland comprising a gland body for feeding a cable therethrough, an elastic sealing ring that is applicable to the front side of the gland body and whose internal diameter essentially corresponds to the diameter of the cable, and a gland ring that is applicable to the sealing ring on the opposite side of the gland body and is maintained by connecting elements in an assembled condition at such an axial distance from the gland body that the sealing ring is clamped between the gland ring and the gland body so that its radially inner surface is pressed against the cable, wherein the connecting elements form a snap-on connection that is closable for the assembly of the cable gland by axially pushing together the gland ring and the gland body and that connects the gland ring and the gland body undetachably in their closed condition.

2. Cable gland according to claim 1, wherein a circular jacket extends from the outer edge of the gland ring that is provided with at least one projecting connecting element on its inner side which, by pressing the gland body and the gland ring together, is slidable over at least one corresponding connecting element on the outside of the gland body while the jacket is elastically deformed and capable of being engaged behind the same.

3. Cable gland according to claim 2, wherein the gland body comprises radially projecting cams that are distributed around its circumference and a corresponding circular projection is provided on the inner side of the jacket which, by pressing the gland body and the gland ring together, is slidable over the cams while the jacket is elastically deformed and capable of being engaged behind the same.

4. Cable gland according to claim 3, wherein the cams are regularly distributed around the circumference of the gland body and a circumferential line of the gland body that runs over cam apexes has a form of a regular convex polygon with rounded edges.

5. Cable gland according to claim 4, wherein a length of the circumferential line is less than or equal to an inner circumference of the projecting connecting element on the inner surface of the jacket.

6. Cable gland according to claim 5, wherein the polygon is biangular and the circumferential line has a form of an ellipse.

7. Cable gland according to claim 5, wherein the polygon is triangular and the circumferential line has a form of a Releaux triangle with rounded edges.

8. Cable gland according to claim 4, wherein the polygon is biangular and the circumferential line has a form of an ellipse.

9. Cable gland according to claim 4, wherein the polygon is triangular and the circumferential line has a form of a Releaux triangle with rounded edges.

10. Cable gland according to claim 1, wherein the sealing ring comprises a first portion that is insertable into the gland body and a following second portion that abuts to an outer front surface of the gland body in the assembled condition.

11. Cable gland according to claim 1, wherein the gland ring comprises a conical clamping surface that presses the sealing ring radially inwards in the assembled condition.

12. Encapsulated inductive proximity sensor, comprising a tubular enclosure one end portion of which forms the gland body of a cable gland according to claim 1 through which a connecting cable is guided into the enclosure.

13. Encapsulated sensor according to claim 12, wherein the enclosure includes a first sleeve that is closed on one side and is provided with an external thread for mounting the sensor, as well as a corresponding second sleeve one end portion of which is tightly inserted in the open end of the first sleeve and whose second end portion forms the gland body of the cable gland, the maximum external diameter of this cable gland being smaller than the external diameter and preferably smaller than the core diameter of the external thread of the first sleeve such that the sensor is insertable into a mounting bore with the cable first.

* * * * *